United States Patent [19]

Borras et al.

[11] Patent Number: 5,303,240
[45] Date of Patent: Apr. 12, 1994

[54] TELECOMMUNICATIONS SYSTEM USING DIRECTIONAL ANTENNAS

[75] Inventors: Jaime A. Borras, Hialeah; Thomas V. D'Amico, Boca Raton; Ronald E. Sharp, Plantation, all of Fla.

[73] Assignee: Motorola, Inc., Schaumburg, Ill.

[21] Appl. No.: 727,031

[22] Filed: Jul. 8, 1991

[51] Int. Cl.$^5$ .............................................. G01S 3/72
[52] U.S. Cl. .................................. 370/95.3; 342/368; 379/60; 455/33.3; 455/277.1
[58] Field of Search ...................... 370/95.3; 379/60; 455/33.3, 33.4, 134, 135, 276.1, 277.1, 277.2; 342/368, 371, 372, 374, 377

[56] References Cited

U.S. PATENT DOCUMENTS

| | | | |
|---|---|---|---|
| 4,065,771 | 12/1977 | Gulick et al. | 342/368 |
| 4,176,356 | 11/1979 | Foster et al. | 343/100 CS |
| 4,334,230 | 6/1982 | Kane | 455/277.1 X |
| 4,704,734 | 11/1987 | Menich et al. | 379/60 X |
| 4,947,178 | 8/1990 | Shafai | 343/700 MS |
| 5,008,680 | 4/1991 | Willey et al. | 342/372 |
| 5,095,535 | 3/1992 | Freeburg | 455/277.1 X |
| 5,157,404 | 10/1992 | Rowe et al. | 342/372 |
| 5,206,655 | 4/1993 | Caille et al. | 342/368 X |

Primary Examiner—Douglas W. Olms
Assistant Examiner—Russell Blum
Attorney, Agent, or Firm—Leslie A. Rhyne; Pablo Meles

[57] ABSTRACT

A communication system 100 for determining the optimum direction (206) for transmitting and receiving a signal in a radio comprises a receiver for receiving a carrier signal being a time divided signal having an instruction signal, a transmitter for transmitting a time divided signal, a directional antenna (10) coupled to said receiver and transmitter, and a steering device (28) for changing the phase of the carrier signal in accordance with the instruction signal.

19 Claims, 5 Drawing Sheets

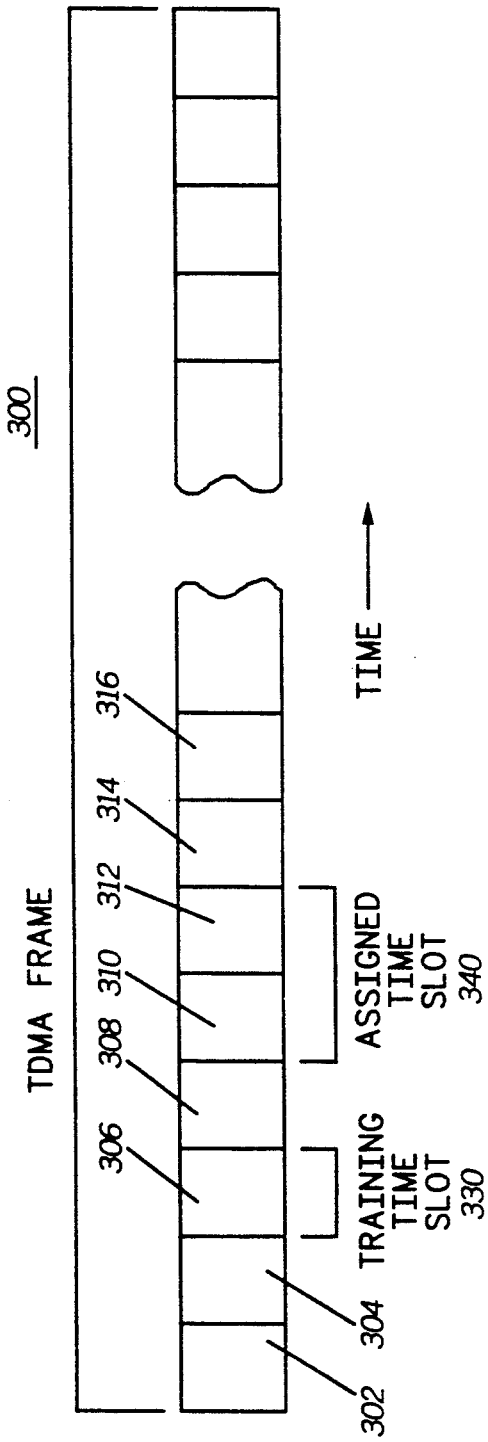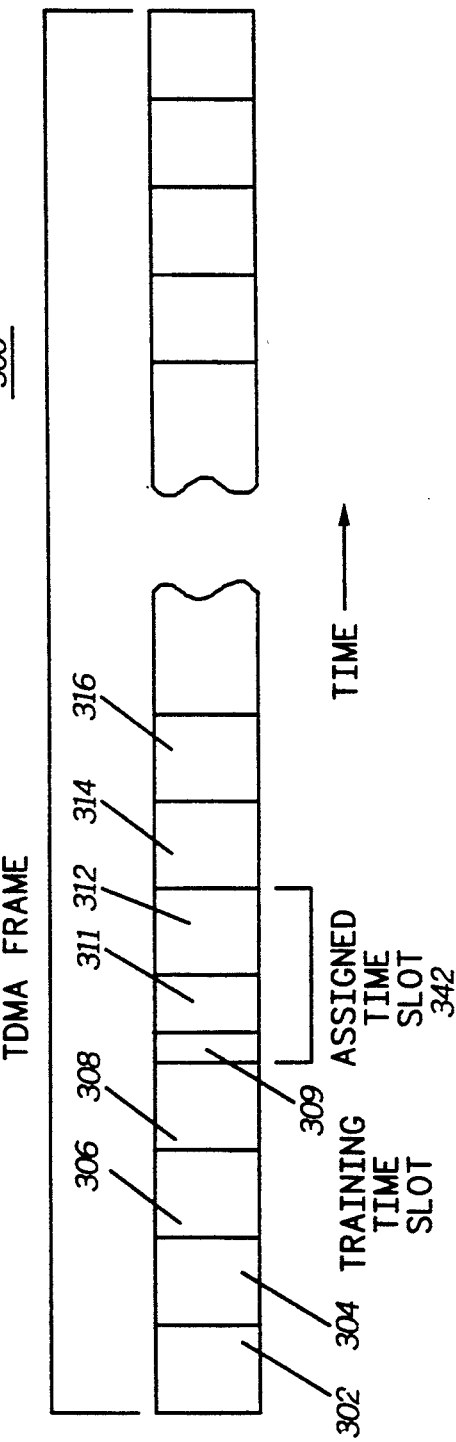

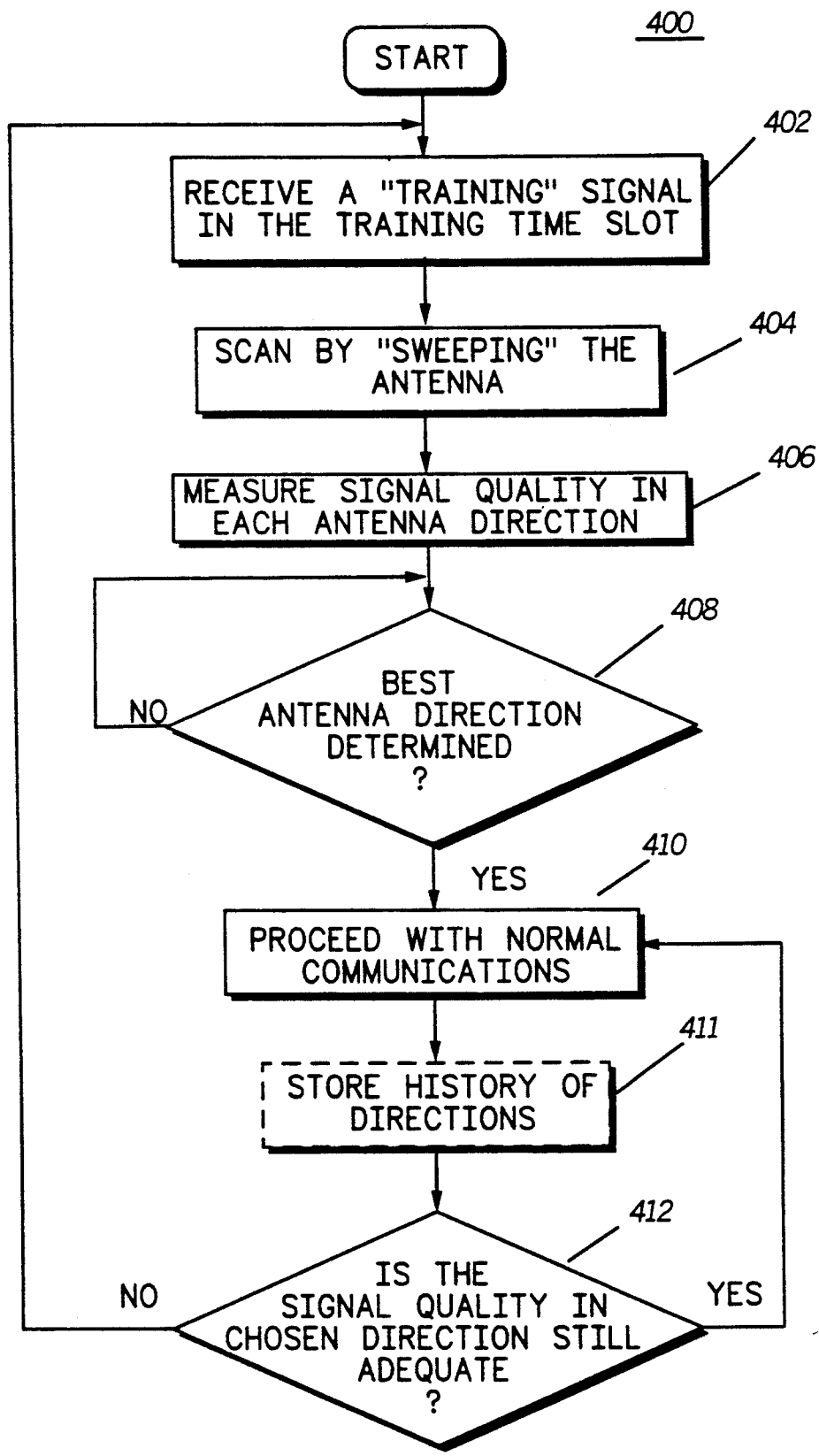

TELECOMMUNICATIONS SYSTEM USING DIRECTIONAL ANTENNAS

TECHNICAL FIELD

This invention relates generally to directional antennas and, more particularly, to directional antennas used in portable communication systems.

BACKGROUND

The tremendous growth in the use of cordless telecommunications systems has increased the demand for a system having high capacity, high quality communications and small, inexpensive subscriber units. The basis for these characteristics is primarily low power digital transmission and small micro-cells. As low power technology advances, the limitations will be the transmit power and/or the feasibility of smaller cells. Of course, these limitations have inherent problems as well as inherent benefits.

If the transmit power in a portable subscriber unit is reduced, the likelihood of decreased range and cell size naturally follows. Use in densely populated areas such as urban and indoor environments results in greater multipath effects. This would limit the data rates available for use within the system. Decreased cell size would result in more base station sites, greater infrastructure, and an increased number of handoffs between cells. Other system problems may exists as well, including the ability to implement a portable controlled handoff, and compensating for an unexpected propagation environment (e.g., irregular cell shapes, moving objects, etc.). Therefore, a need for compensating for these limitations exists.

Using a directional antenna provides increased system gain in a limited direction by reducing the system gain in other directions. The use of a plurality of antennas and/or a means of steering a given number of antennas in addition to measuring signal quality (in a given direction) would allow the selection of a particular direction to achieve improved system gain. Antenna arrays are typically used to steer an antenna beam electronically. The array typically consists of antenna elements such as dipoles or slots, waveguides or horns, and microstrip antennas or other configurations. These arrays can be electronically steered by phase shifting the reception or transmission signal. Of course, other means of steering an antenna (including mechanically rotating) would be within contemplation of the present invention.

SUMMARY OF THE INVENTION

A method for improving telecommunications using a directional antenna in a radio-frequency communications system comprises the steps of transmitting an information signal having a training signal at a first radio, receiving the information signal at a second radio having a plurality of antenna settings and then steering the antenna in a setting in accordance with the training signal.

BRIEF DESCRIPTION OF THE DRAWINGS

FIG. 4 is a TDMA time slot arrangement in accordance with the present invention.

FIG. 5 is a another TDMA time slot arrangement in accordance with the present invention.

FIG. 6 is a flow chart of the algorithm for the selection of the optimum antenna direction.

DETAILED DESCRIPTION OF THE PREFERRED EMBODIMENT

Figure 1:
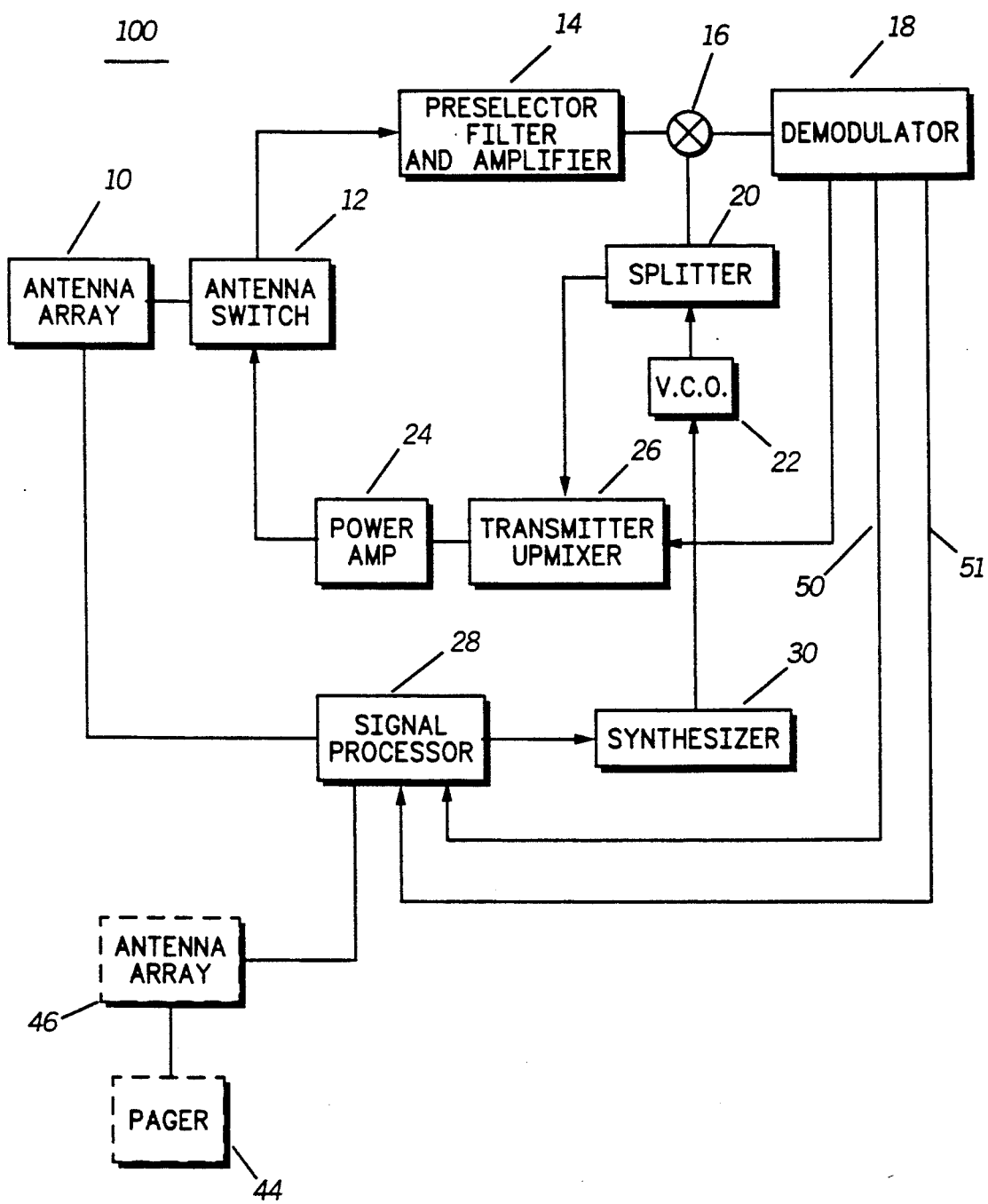
FIG. 1 is a block diagram of a transceiver in accordance with the present invention.

Referring to FIG. 1, there is shown a block diagram of a telecommunications system 100 that preferably uses an electronically controlled directional antenna in a portable communication unit such as a portable two way radio for aiming, steering, or "sweeping" the antenna. Preferably, the signal quality received at the portable communication unit determines the antenna steering. The best "signal quality" could mean the best signal strength, the best signal-to-noise (S/N) ratio, signal-to-interference (S/I) ratio, or other signal quality determining factor. This system is preferably for use in a portable transceiver and/or a base station.

The telecommunications system 100 preferably comprises an antenna array 10 coupled to a signal processor 28 and an antenna switch 12. The antenna switch 12 is coupled to a preselector filter and amplifier 14 on the receive side while a power amplifier 24 and transmitter upmixer 26 are coupled to the transmit side of the antenna switch 12. The preselector filter 14 provides a carrier frequency signal to a mixer 16. The mixer 16 mixes the carrier frequency signal with an injection signal from a voltage controlled oscillator (VCO) 22 through splitter 20 which is preferably coupled to a programmable synthesizer 30. The mixer 16 provides an intermediate frequency which is demodulated by a demodulator 18. The demodulator 18 provides a feedback signal to both the transmitter upmixer 26 and the signal processor 28. The feedback signal from the demodulator 18 to the microprocessor is preferably a radio signal strength indicator (RSSI) signal 50 and/or a recovered data signal 51. Also, a splitter 20, coupled between the mixer 16 and the voltage controlled oscillator 22 provides the injection signal to the transmitter upmixer 26. Optionally, a pager antenna array 46 is coupled to the signal processor 28. In this manner, the telecommunications system 100 can scan for pager signals received at the pager antenna array 46 as well as the signals received by the antenna array 10.

Figure 2:
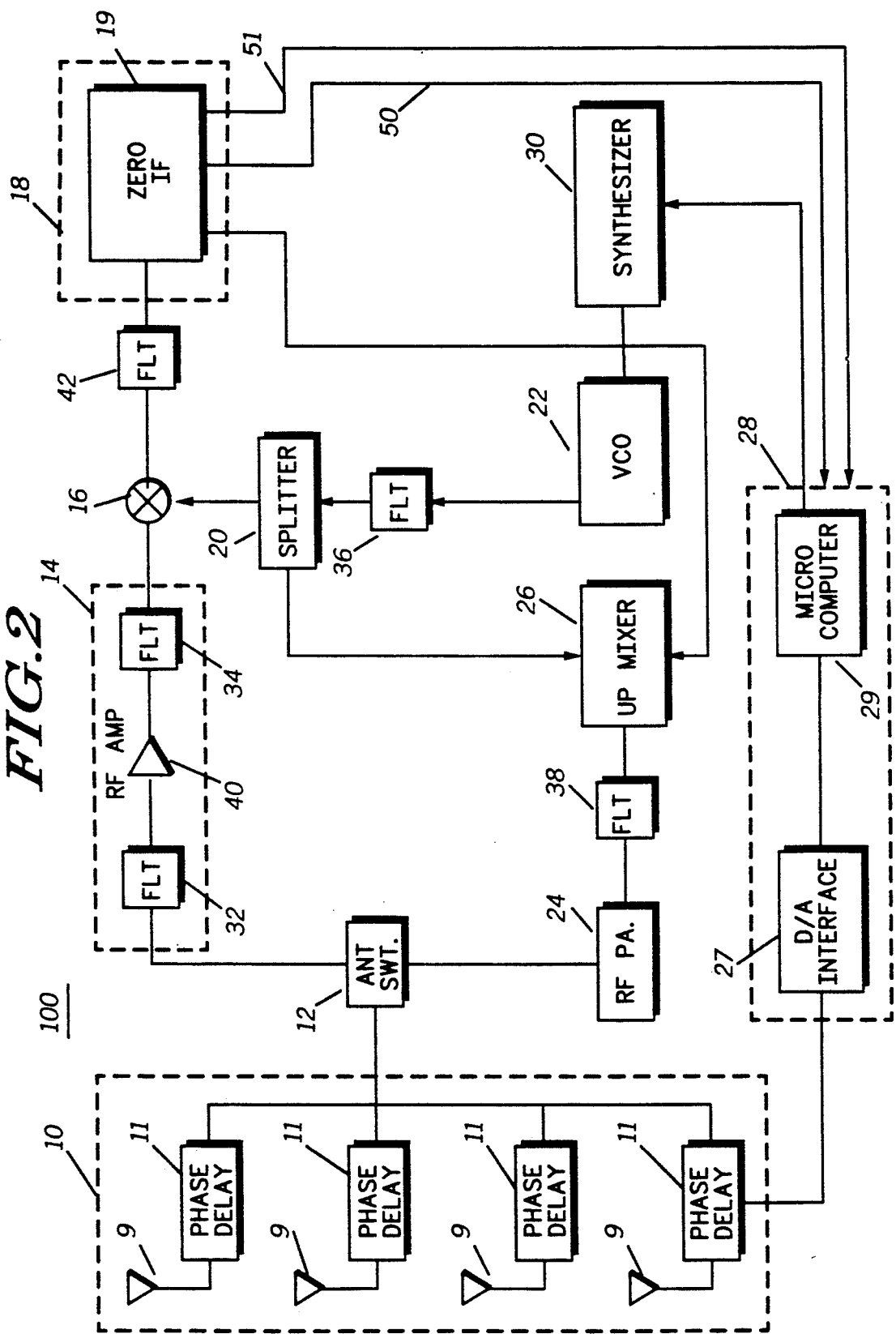
FIG. 2 is a more detailed schematic block diagram of the transceiver of FIG. 1 in accordance with the present invention.

Referring to FIG. 2, there is shown a more detailed block diagram of the telecommunications system 100. Once again, the telecommunications system 100 preferably comprises an antenna array 10 having a plurality of antennas 9 coupled to phase delay circuits 11 respectively, which will continuously vary the progressive phase between the antennas controlled by the signal processor 28. Optionally, a pager (not shown) is coupled to the signal processor 28 as previously discussed. The antenna array 10 is coupled to the signal processor 28 which preferably comprises a microcomputer 29 such as the Motorola 68HC11, preferably having any combination of RAM, ROM, and/or EEPROM, and a digital to analog converter interface 27. The antenna array is also coupled to an antenna switch IC 12 which may serve to selectively split the receive and transmit signals. The antenna switch 12 is preferably coupled to a preselector filter and amplifier 14 on the receive side.

The preselector filter and amplifier 14 preferably comprises a Radio Frequency (RF) amplifier 40 coupled between a pair of two pole filters 32 and 34 to provide four poles of filtering for Radio Frequency (RF) front end selectively. The preselector filter and amplifier 14 provides a carrier frequency signal of about 864 MHz to a mixer 16. The mixer 16 mixes the carrier frequency signal with an injection signal (about 791 MHz) from voltage controlled oscillator 22 (preferably including a buffer and a X3 multiplier as is known in the art) which is preferably coupled to a programmable synthesizer 30. The mixer 16 provides an intermediate frequency signal of about 74.4 MHz which is demodulated by a demodulator 18, preferably after a saw filter 42 which filters out the unwanted signals. The demodulator 18 preferably comprises a zero intermediate frequency (IF) IC 19 which amplifies and down converts the intermediate frequency to a baseband signal for further processing.

A power amplifier 24 IC and transmitter upmixer IC 26 is preferably coupled to the transmit side of the antenna switch 12. Preferably, a 3 pole filter 38 is coupled between the upmixer 26 and the power amplifier 24. Preferably, the three pole filter 38 in the transmit path filters any undesired signals out of the transmitted spectrum. The Zero IF IC 19 provides feedback signals to both the transmitter upmixer 26 and the signal processor 28. The feedback signal from the demodulator 18 to the signal processor 28 is preferably a RSSI (received signal strength indicator) signal 50 and/ or a recovered data signal 51. Baseband data through the demodulator 18 preferably provides the signal processor 28 with the recovered data signal 51. Also, a splitter 20, coupled between the mixer 16 and the voltage controlled oscillator 22 splits the injection signal to the transmitter upmixer 26 and the mixer 16. Finally, another 3 pole filter 36 is preferably coupled between the splitter 20 and the VCO 22.

Figure 3:
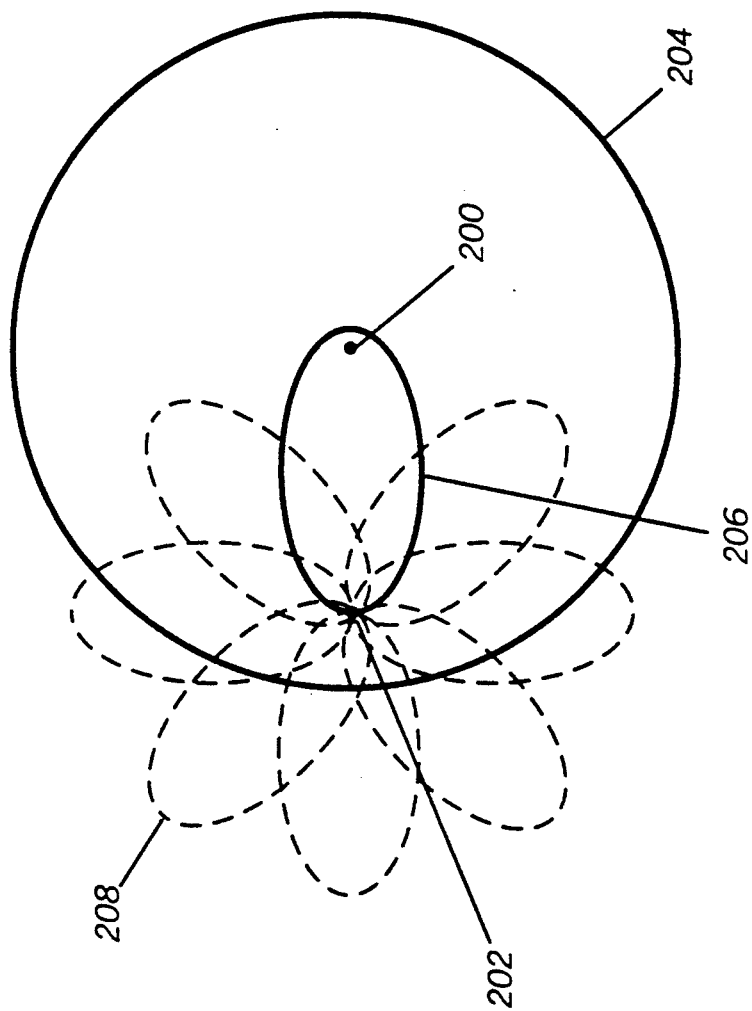
FIG. 3 is a block diagram of a telecommunications system using directional antennas in accordance with the present invention.

Referring to FIG. 3, there is shown a base station 200 and a typical base coverage area 204 providing a fairly consistent cell pattern. In the preferred embodiment, the base station 200 would provide consistent cell patterns preferably using omni or sectored antennas with no time-varying aiming or steering of the base station antennas. This permits the portables to control the handoff process by measuring signal quality (i.e., signal strength) of other communication resources such as other base stations, portables, frequencies, channels, or time slots within frequencies to determined when an intra-cell handoff is indicated. A portable communication unit 202 having a directional antenna (not shown) provides a radiation pattern substantially as shown with its antenna steered in various positions, the radiation pattern being a function of the antenna or antennas and the surrounding environment. The radiation direction 208 does not provide the strongest signal quality for communications between the base station 200 and the portable communication unit 202. The selected direction 206 provides the best signal quality, and after scanning and measuring for signal quality, the portable communication unit 202 selects the direction 206. Of course, the present invention is applicable to all radios (either mobile, portable, or base station) preferably using a time divided signal system such as in a TDMA system. Thus, the same scheme functions where the base station has the scanning antennas and functions essentially as the portable communication unit 202. Additionally, in another embodiment, both the base station and the portable would have scanning directional antennas. Likewise, the present invention could function between portables communication units having scanning directional antennas themselves.

The present invention preferably incorporates the systems of time division, and more particularly, time division multiple access (TDMA) and time division duplex in addition to frequency division. Thus the same frequency is used for a base station transmit and receive, but offset in time. Also, multiple base or portable transmit slots exist in a frame where a base or portable transmits in at least two slots on the same frequency. Thus, a frame of time, and slots within the frame of time in one frequency carries information to "train" or select the antenna direction offering the best signal quality. Using this format, a base station or a portable or both could use at least one slot (or a portion of a slot) per frame to "train" or select the antenna direction.

Referring to FIG. 4 and FIG. 5, there is shown a typical TDMA time slot arrangement in accordance with the present invention. In FIG. 4, slots 302, 306, 310, and 314 are base transmit slots while slots 304, 308, 312 and 316 are base receive slots. Using the format shown, the portable unit 202 (of FIG. 3) uses at least one slot (306, but slot 302 could have been used as well) per frame to select the antenna direction and another two slots (312 and 310) within the frame to receive and transmit to the base station 200. The training time slot 330 in this instance is slot 306 and the assigned time slots 340 for transmitting and receiving are slots 310 and 312. Again, the present invention is not restricted to the assigned slot arrangements shown.

Alternatively, "training" time may be added to the beginning of a base station transmit slot, in which case only one base transmit slot is required. Referring to FIG. 5, the training time slot 309 is within the assigned time slots 342. More particularly, the training time 309 takes up a portion of the base transmit slot 311, while slot 312 remains as the base receive slot. Otherwise, the frame 300 of FIG. 5 is substantially the same as the frame 300 of FIG. 4. Due to the reciprocity in the propagation environment, the direction selected to receive the base station signal is equally valid to transmit to the base station on the same or nearby frequency, assuming the propagation environment is essentially stable since training was performed. Thus it is desirable to minimize the elapsed time between training and receive/transmit, consistent with the characteristics of the propagation environment.

Referring to FIG. 6, there is shown a typical algorithm that could be used with the present invention for the selection of an antenna direction. First, a transceiver would need to receive a "training" signal in the training time slot (402). Then the transceiver, (preferably the portable communication unit) would scan by "sweeping" the antenna (404) preferably using a scanning means and then measure the signal quality in each antenna direction (406) preferably using a signal quality measuring means. The best antenna direction is selected (408) preferably using a steering means which steers the antenna in the direction providing the best signal quality. Once the best direction is assigned, then normal communications can proceed (410). However, if it is later determined that the chosen direction is inadequate (412) or not optimal, another direction may be selected. For example, if the receive time slot is corrupted, the portable communication unit may about decoding the slot and use the remainder of the slot to "train" or select a new direction to use for the transmit time slot. Also, the algorithm may store the past history of directions (411), including alternate choices in order to make a better decision when choosing antenna direction.

In the preferred embodiment, the base stations transmit in a consistent cell pattern as shown in FIG. 3 preferably using omni or sectored antennas with no time-varying aiming of the antennas. Again, this allows the portables to control the handoff process by measuring the signal quality of other communication resources such as other base stations, portables, frequencies, channels, and other time slots before determining when an intra-cell or inter-cell handoff is indicated. However, it may be desirable to implement electronically controlled directional antennas at the base stations using a scheme similar to the one used in the portable. This results in a further reduction in required transmit power from the portable and base station as well as a further increase in the frequency re-use factor (traffic capacity) of the system. One method of implementing this scheme presently would be to allow the portable communication units to transmit additional "training" time at the beginning of their transmit slot to permit the base station to sweep (scan and steer) antenna direction and determine the optimum direction to receive and transmit to the portable. Even with the base station using a steering antenna as well, it is still possible for the portable communication units to have a controlled handoff if base stations transmit in a consistent cell pattern in one or more time slots. This consistent pattern would also be used when broadcasting to the portable communication unit such as when the base station calls the portable communication units.

What is claimed is:

1. A device in a communication system capable of determining the optimum direction for receiving and transmitting a signal, comprising:
   a receiver for receiving a carrier signal being a time divided signal;
   at least one directional antenna being an array of phase delay antennas coupled to the receiver;
   scanning means for sweeping the directional antenna in different directions within a TDMA time frame;
   signal quality measuring means for determining an optimum antenna direction within the TDMA time frame;
   steering means for selecting an optimum antenna direction; and
   transmitting means coupled to said steering means for transmitting on said directional antenna according to said selected optimum antenna direction.

2. The device of claim 1, wherein said device comprises a pager.

3. The device of claim 1
   wherein the steering means comprises the change in phase of the carrier signal in accordance with the received time divided signal having a training signal.

4. A device in a communication system capable of determining the optimum direction for receiving and transmitting a signal, comprising:
   a receiver for receiving a carrier signal being a time divided signal;
   at least one directional antenna coupled to the receiver;
   scanning means comprising a microprocessor and an array of phase delay antennas for sweeping the directional antenna in different directions within a TDMA time frame;
   signal quality measuring means for determining an optimum antenna direction within the TDMA time frame;
   steering means for selecting an optimum antenna direction; and
   transmitting means coupled to said steering means for transmitting on said directional antenna according to said selected optimum antenna direction.

5. A portable radio used in a communication system capable of determining the optimum direction for transmitting and receiving a signal, comprising:
   a receiver for receiving a carrier signal being a time divided signal;
   a transmitter for transmitting a time divided signal;
   at least one directional antenna being an array of phase delay antennas coupled to the receiver and the transmitter;
   scanning means for sweeping the directional antenna in different directions within a TDMA time frame;
   signal quality measuring means for determining an optimum antenna direction within the TDMA time frame; and
   steering means for selecting an optimum antenna direction.

6. The radio of claim 5
   wherein the steering means comprises the change in phase of the carrier signal in accordance with the received time divided signal having a training signal.

7. A radio used in a communication system capable of determining the optimum direction for transmitting and receiving a signal, comprising:
   a receiver for receiving a carrier signal being a time divided signal;
   a transmitter for transmitting a time divided signal;
   at least one directional antenna coupled to the receiver and the transmitter;
   scanning means comprising a microprocessor and an array of phase delay antennas for sweeping the directional antenna in different directions within a TDMA time frame;
   signal quality measuring means for determining an optimum antenna direction within the TDMA time frame; and
   steering means for selecting an optimum antenna direction.

8. A communication system capable of determing the optimum direction for transmitting and receiving a signal in a radio, comprising:
   a receiver for receiving a carrier signal being a time divided signal;
   a transmitter for transmitting a time divided signal;
   at least one directional antenna coupled to the receiver and the transmitter;
   scanning means for sweeping the directional antenna in different directions within a TDMA time frame;
   signal quality measuring means for determining an optimum antenna direction within the TDMA time frame; and
   steering means for selecting an optimum antenna direction wherein the steering means comprises the change in phase of the carrier signal in accordance with the time divided signal having a training signal.

9. A communication system capable of determining the optimum direction for transmitting and receiving a signal in a radio, comprising:

a receiver for receiving a carrier signal being a time divided signal;

a transmitter for transmitting a time divided signal;

at least one directional antenna having an array of phase delay antennas coupled to the receiver and the transmitter;

scanning means for sweeping the directional antenna in different directions within a TDMA time frame;

signal quality measuring means for determining an optimum antenna direction within the TDMA time frame; and steering means for selecting an optimum antenna direction.

10. The communication system of claim 9 wherein the steering means comprises a signal processor having a microcomputer and a digital-to-analog converter.

11. The communication system of claim 9 comprising a portion of an assigned TDMA time slot within a TDMA frame 12. A communication system capable of determining the optimum direction for transmitting and receiving a signal in a radio, comprising:

a receiver for receiving a carrier signal being a time divided signal;

a transmitter for transmitting a time divided signal;

at least one directional antenna coupled to the receiver and the transmitter;

scanning means for sweeping the directional antenna in different directions within a TDMA time frame;

signal quality measuring means for determining an optimum antenna direction within the TDMA time frame; and steering means for selecting an optimum antenna direction wherein the steering means comprises a microprocessor and an array of phase delay antennas.

13. A communication system capable of determining the optimum direction for transmitting and receiving a signal in a radio, comprising:

a receiver for receiving a carrier signal being a time divided signal;

a transmitter for transmitting a time divided signal;

at least one directional antenna coupled to the receiver and the transmitter;

scanning means for sweeping the directional antenna in different directions within a TDMA time frame and wherein the scanning means comprises a microprocessor and an array of phase delay antennas;

signal quality measuring means for determining an optimum antenna direction within the TDMA time frame;

steering means for selecting an optimum antenna direction.

14. In a radio-frequency communications system, a method for improving telecommunications using a directional antenna, comprising the steps of:

at a first communication unit:

transmitting an information signal having a training signal;

at a second communication unit having an array of phase delay antennas with a plurality of antenna settings:

receiving said information signal by said array of antennas;

steering said array of antennas in a setting in accordance with said training signal within a TDMA time frame;

transmitting by said array of antennas in accordance with said training signal within the TDMA time frame;

wherein said training signal comprises a portion of a time slot within said TDMA time slot arrangement.

15. In a radio-frequency communications system, a method for improving telecommunications using a directional antenna, comprising the steps of:

at a first communication unit:

transmitting in an omni pattern an information signal having a training signal;

at a second communication unit having an array of phase delay antennas with a plurality of antenna settings:

receiving said information signal by said array of antennas;

steering said array of antennas in a setting in accordance with said training signal within a TDMA time frame; and transmitting by said array of antennas in accordance with said training signal within the TDMA time frame;

wherein said omni pattern allows for the steering of said directional antenna and for a handoff controlled by said second communication unit.

16. In a communication system, a method of aiming an antenna primarily based on signal quality received during directional scanning, comprising the steps of:

at a base station:
 (a) transmitting a TDMA information signal on a given frequency wherein said TDMA information signal includes a training signal comprising a portion of a time slot within a TDMA frame;

at a portable communication unit:
 (a) receiving said TDMA information signal;
 (b) scanning for the information signal having the best signal quality from all possible antenna directions within a TDMA time frame;
 (c) measuring the signal quality of each information signal within the TDMA time frame; and
 (d) assigning a given antenna direction based on the optimum signal quality received.

17. The method of claim 16, wherein said method of aiming an antenna comprises the further step of:
 (e) continuing to measure for an optimum signal quality for each information signal and reassigning the antenna direction before the signal becomes corrupted.

18. The method of claim 16, wherein said method of aiming an antenna comprises the further step of:
 (f) storing a history of antenna directions.

19. The method of claim 16, wherein said method of aiming an antenna comprises the further step of:
 (g) controlling the handoff process by measuring the signal quality of other communication resources and determining when an inter-cell or intra-cell handoff is indicated.

* * * * *